(12) United States Patent
Drexler et al.

(10) Patent No.: US 9,855,721 B2
(45) Date of Patent: Jan. 2, 2018

(54) NONWOVEN DECORATIVE LAMINATES AND METHODS OF MAKING THE SAME

(71) Applicant: The Boeing Company, Chicago, IL (US)

(72) Inventors: Jason W. Drexler, Brier, WA (US); Samantha L. Bronner, Seattle, WA (US)

(73) Assignee: The Boeing Company, Chicago, IL (US)

( * ) Notice: Subject to any disclaimer, the term of this patent is extended or adjusted under 35 U.S.C. 154(b) by 417 days.

(21) Appl. No.: 14/496,469

(22) Filed: Sep. 25, 2014

(65) Prior Publication Data

US 2016/0089851 A1    Mar. 31, 2016

(51) Int. Cl.
*B64C 1/00* (2006.01)
*B32B 5/02* (2006.01)
(Continued)

(52) U.S. Cl.
CPC .............. *B32B 5/022* (2013.01); *B32B 7/12* (2013.01); *B32B 27/12* (2013.01); *B32B 27/304* (2013.01);
(Continued)

(58) Field of Classification Search
CPC .............. B32B 2605/18; B32B 27/304; B32B 2405/00; B32B 2307/3065; B32B 2262/106; B32B 2262/101; B32B 2262/0284; B32B 2262/0261; B32B 2262/0253; B32B 2262/02;
(Continued)

(56) References Cited

U.S. PATENT DOCUMENTS 4,409,280 A * 10/1983 Wiley ...................... B32B 5/24
                                                         428/159
4,693,926 A *  9/1987 Kowalski ............... B32B 27/30
                                                         156/123
(Continued)

OTHER PUBLICATIONS

Extended European Search Report dated Feb. 3, 2016, for corresponding EP application EP15186806.4-1303, Applicant The Boeing Company, 6 pages.
(Continued)

*Primary Examiner* — Assres H Woldemaryam

(57) ABSTRACT

A decorative laminate for application to a structural component is provided. The decorative laminate has a substrate layer of a nonwoven fabric material with or without a flame retardant material. The decorative laminate further has an embossable layer disposed upon the substrate layer. The embossable layer includes an embossing resin material and the flame retardant material. The decorative laminate further has a protective layer disposed upon the embossable layer. The protective layer includes a polyvinyl fluoride-based material and has a decorative material printed on a first side of the protective layer facing the embossable layer. An adhesive layer is applied to the substrate layer of the decorative laminate. The decorative laminate is applied to the structural component with the substrate layer facing a bonding surface of the structural component and with an adhesive layer applied between the decorative laminate and the bonding surface of the structural component.

20 Claims, 5 Drawing Sheets

(51) Int. Cl.
  B32B 27/12    (2006.01)
  B32B 27/30    (2006.01)
  B32B 7/12     (2006.01)
  B32B 37/12    (2006.01)
  B32B 37/18    (2006.01)
  B32B 38/00    (2006.01)
  B44C 1/10     (2006.01)
  B64C 1/12     (2006.01)

(52) U.S. Cl.
  CPC ........ *B32B 37/1284* (2013.01); *B32B 37/182* (2013.01); *B32B 38/145* (2013.01); *B44C 1/10* (2013.01); *B64C 1/12* (2013.01); *B32B 2260/021* (2013.01); *B32B 2262/02* (2013.01); *B32B 2262/0253* (2013.01); *B32B 2262/0261* (2013.01); *B32B 2262/0284* (2013.01); *B32B 2262/101* (2013.01); *B32B 2262/106* (2013.01); *B32B 2307/3065* (2013.01); *B32B 2405/00* (2013.01); *B32B 2451/00* (2013.01); *B32B 2605/18* (2013.01)

(58) Field of Classification Search
  CPC ............ B32B 2260/021; B32B 38/145; B32B 37/182; B32B 37/12
  See application file for complete search history.

(56) References Cited

U.S. PATENT DOCUMENTS

| | | | | |
|---|---|---|---|---|
| 6,333,280 | B1* | 12/2001 | Hashimoto | B32B 5/28 428/328 |
| 8,540,914 | B2 | 9/2013 | Wilde et al. | |
| 8,607,927 | B2* | 12/2013 | Richardson, III | B64C 1/40 181/294 |
| 2002/0160680 | A1* | 10/2002 | Laurence | B32B 27/36 442/394 |
| 2002/0182957 | A1 | 12/2002 | Levenda | |
| 2006/0178264 | A1* | 8/2006 | Kameshima | B32B 27/10 502/439 |
| 2006/0240217 | A1* | 10/2006 | Foss | B32B 33/00 428/97 |
| 2006/0280917 | A1* | 12/2006 | Wilde | B32B 27/00 428/204 |
| 2010/0015420 | A1* | 1/2010 | Riebel | B32B 27/06 428/203 |
| 2010/0209679 | A1* | 8/2010 | Tompkins | B32B 5/028 428/201 |
| 2012/0027989 | A1* | 2/2012 | Nishiyama | B29C 70/202 428/113 |
| 2012/0291377 | A1* | 11/2012 | Riebel | B32B 27/36 52/232 |
| 2014/0087616 | A1* | 3/2014 | Adams | C09J 7/04 442/149 |
| 2014/0120303 | A1* | 5/2014 | Wilde | B29C 63/481 428/116 |
| 2014/0162020 | A1* | 6/2014 | Wang | B32B 5/12 428/113 |

OTHER PUBLICATIONS

Web page from Felix Schoeller Group website, at web address <http://www.felix-schoeller.com/en_en/business-unit/nonwovens/applications.html?gallary_id=contact_252_334>, regarding information for nonwoven wallpaper, as of Sep. 24, 2014, 1 page.

EPO Examination Report, dated Mar. 31, 2017, for corresponding EP application EP15186806.4-1377, Applicant The Boeing Company, 4 pages.

* cited by examiner

NONWOVEN DECORATIVE LAMINATES AND METHODS OF MAKING THE SAME

BACKGROUND

1) Field of the Disclosure

The disclosure relates generally to decorative laminates and methods of making the same, and more particularly, to nonwoven decorative laminates and methods of making the same, where the nonwoven decorative laminates are used on structural components, such as aircraft interior structural components.

2) Description of Related Art

Decorative laminates are used in a wide variety of applications, including for surfaces of walls, countertops, and other structures, such as interior structural components of aircraft. For example, decorative laminates may be applied to the surfaces of such aircraft interior structural components as cabin interior sidewall and ceiling panels, floor panels, stowage bins, lavatory and galley panels and structures, bulkhead partitions, and other aircraft interior structural components.

Decorative laminates typically include a substrate or supporting layer which may be embossable to provide the decorative laminate with texture, a decorative layer that overlies the substrate layer, and a protective layer that overlies the decorative layer. Other layers may be included between the substrate, decorative and protective layers in specific decorative laminates, depending upon the nature of the materials used and the desired laminate characteristics. The decorative layer may be printed with various patterns and colors to provide a decorative effect to the decorative laminate.

Decorative laminates may be manufactured by printing, embossing, molding, and/or laminating the layers of the decorative laminate using a high temperature and pressure lamination and embossing forming process. The formed decorative laminate may then be bonded to a surface of an aircraft interior structural component via adhesive or another bonding agent.

One known decorative laminate and method of manufacturing the decorative laminate includes using a substrate layer of polyvinyl fluoride (PVF) films with an adhesive-based embossing resin bonding to various layers. However, such substrate layer films used in this known decorative laminate and method are biaxially oriented (i.e., the film is stretched in two different directions) and may distort or shrink when exposed to elevated processing temperatures. This may result in wrinkling of the decorative laminate, and in turn, rejection of the decorative laminate during production based on quality requirements.

Moreover, such substrate layer films used in this known decorative laminate and method may be difficult to print on and may be manufactured via batch production (i.e., processing items in groups or batches, where a specific process for each item takes place at the same time on a batch of items, and that batch does not move to the next stage of production or inspection until the entire batch is completed). Batch processing of decorative laminates may be time-consuming and highly variable, and may result in increased manufacturing and labor costs and quality inconsistencies.

Further, such substrate layer films used in this known decorative laminate and method may have a decreased number of surface interfaces for light to pass through, which, in turn, may result in a decreased opacity of the decorative laminate. Decreased opacity may allow the underlying aircraft interior structural component to be viewed. This may be undesirable as the underlying aircraft interior structural component may be unattractive or otherwise unappealing to view.

Another known decorative laminate and method of manufacturing the decorative laminate includes using a substrate layer of woven fiber material with an embossable layer and a protective layer. However, such woven fiber substrate layer used in this known decorative laminate may have a repeating pattern. When such repeating pattern is combined with a print design or decorative design on the embossable layer or the protective layer laid above the woven fiber substrate layer, the repeating pattern and the print or decorative design may create a superimposed pattern that affects the overall appearance of the decorative laminate. This may result in rejection of the decorative laminate during production based on appearance or aesthetic requirements.

Accordingly, there is a need in the art for an improved decorative laminate and method of making the same that provide advantages over known decorative laminates and methods.

SUMMARY

Example implementations of the present disclosure provide an improved decorative laminate and method of making the same. As discussed in the below detailed description, embodiments of the improved decorative laminate and method of making the same may provide significant advantages over existing decorative laminates and methods.

In an embodiment of the disclosure, there is provided a decorative laminate for application to a structural component. The decorative laminate comprises a substrate layer comprising a nonwoven fabric material with or without a flame retardant material.

The decorative laminate further comprises an embossable layer disposed upon the substrate layer. The embossable layer comprises an embossing resin material and the flame retardant material.

The decorative laminate further comprises a protective layer disposed upon the embossable layer. The protective layer comprises a polyvinyl fluoride-based material and has a decorative material printed on a first side of the protective layer facing the embossable layer. The decorative laminate is applied to the structural component with the substrate layer facing a bonding surface of the structural component and with an adhesive layer applied between the decorative laminate and the bonding surface of the structural component.

In another embodiment of the disclosure, there is provided an aircraft. The aircraft comprises a fuselage and at least one wing coupled to the fuselage. The aircraft further comprises at least one aircraft structural component having a decorative laminate.

The decorative laminate comprises a substrate layer comprising a nonwoven fabric material with or without a flame retardant material. The decorative laminate further comprises an embossable layer disposed upon the substrate layer. The embossable layer comprises an embossing resin material and the flame retardant material.

The decorative laminate further comprises a protective layer disposed upon the embossable layer. The protective layer comprises a polyvinyl fluoride-based material and has a decorative material printed on a first side of the protective layer facing the embossable layer. The decorative laminate is applied to the at least one aircraft structural component with the substrate layer facing a bonding surface of the at least one aircraft structural component and with an adhesive layer applied between the decorative laminate and the bonding surface of the at least one aircraft structural component.

In another embodiment of the disclosure, there is provided a method of making a decorative laminate for application to a structural component. The method comprises the step of printing a decorative material on a first side of a protective layer to form a printed decorative material side. The protective layer comprises a polyvinyl fluoride-based material.

The method further comprises the step of providing a substrate layer comprising a nonwoven fabric material with or without a flame retardant material. The method further comprises the step of providing an embossable layer comprising an embossing resin material and the flame retardant material.

The method further comprises the step of forming the decorative laminate by layering sequentially and laminating the substrate layer, the embossable layer over the substrate layer, and the protective layer over the embossable layer, with the printed decorative material side of the protective layer adjacent the embossable layer. The method further comprises the step of adding an adhesive layer to the substrate layer of the decorative laminate that has been formed. The method further comprises the step of applying the decorative laminate to the structural component, wherein the adhesive layer on the substrate layer is adjacent a bonding surface of the structural component.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein.

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and will fully convey the scope of the disclosure to those skilled in the art.

Figure 1:
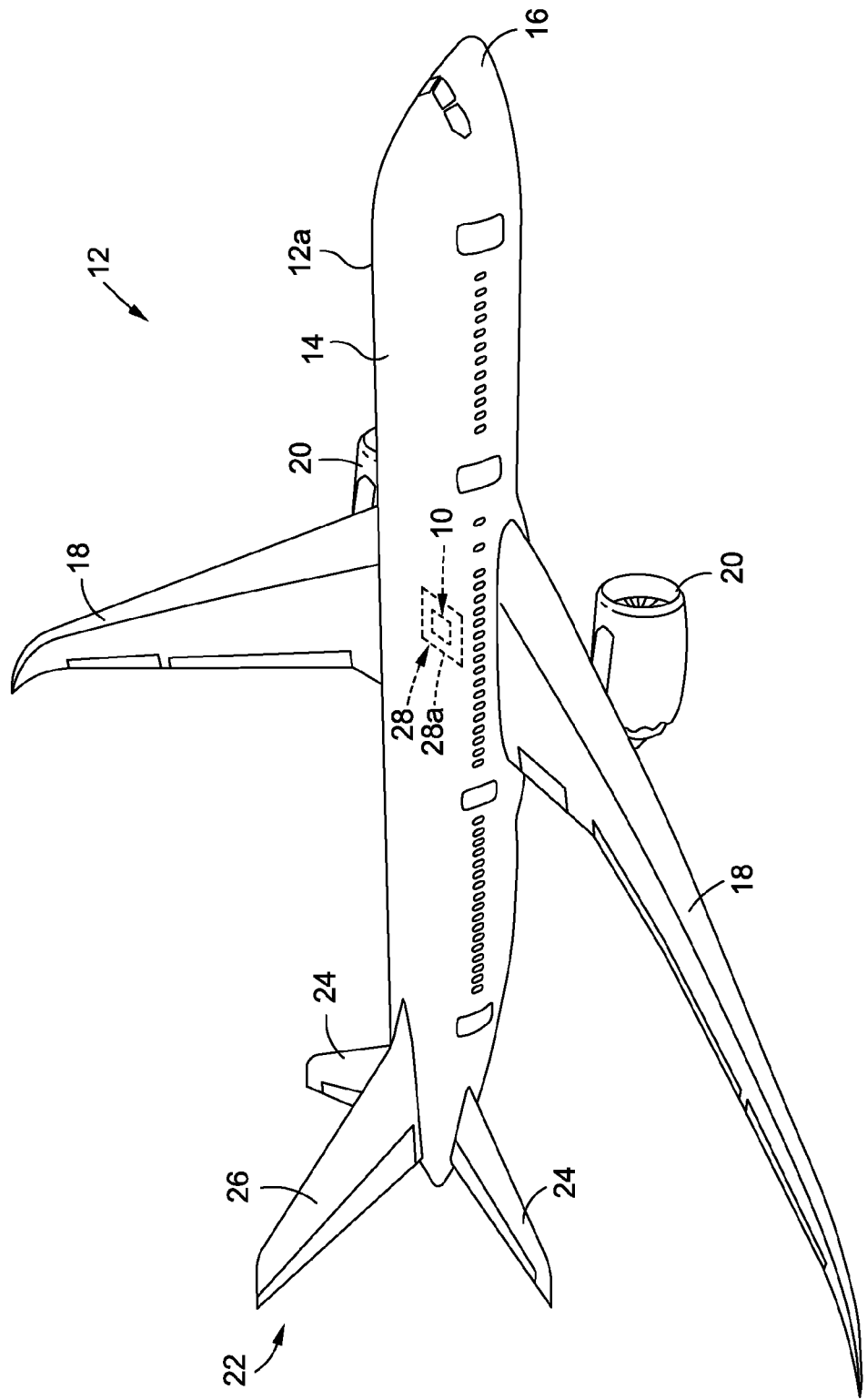
FIG. 1 is an illustration of a perspective view of an air vehicle that incorporates one or more embodiments of a decorative laminate of the disclosure.

Now referring to the Figures, FIG. 1 is an illustration of a perspective view of an air vehicle 12, such as in the form of aircraft 12a, that incorporates one or more embodiments of a decorative laminate 10, of the disclosure. As further shown in FIG. 1, the air vehicle 12, such as in the form of aircraft 12a, comprises a fuselage 14, a nose 16, wings 18, engines 20, and an empennage 22 comprising horizontal stabilizers 24 and a vertical stabilizer 26.

As further shown in FIG. 1, the air vehicle 12, such as in the form of aircraft 12a, comprises one or more structural components 28, such as in the form of aircraft structural components 28a, that may be covered with one or more decorative laminates 10, as disclosed herein. The one or more structural components 28, such as in the form of aircraft structural components 28a, are preferably interior aircraft structural components that may be covered with one or more decorative laminates 10, for example, interior ceiling and sidewall decorative panels, cabin interior sidewall and ceiling panels, floor panels, stowage bins, lavatory and galley panels and structures, bulkhead partitions, cargo bin liners, window shades, insulation barriers, moisture barriers, composite noise panels, and other suitable aircraft structural components 28a.

In an exemplary embodiment, the structural component 28 (see FIG. 1) comprises the aircraft structural component 28a (see FIG. 1) on an air vehicle 12, such as aircraft 12a (see FIG. 1). In other embodiments (not shown), the structural component 28 (see FIG. 1) may comprise a rotorcraft structural component on a rotorcraft, a spacecraft structural component on a spacecraft, a watercraft structural component on a watercraft, an automobile structural component on an automobile, a truck structural component on a truck, or another suitable structural component 28.

Figure 2:
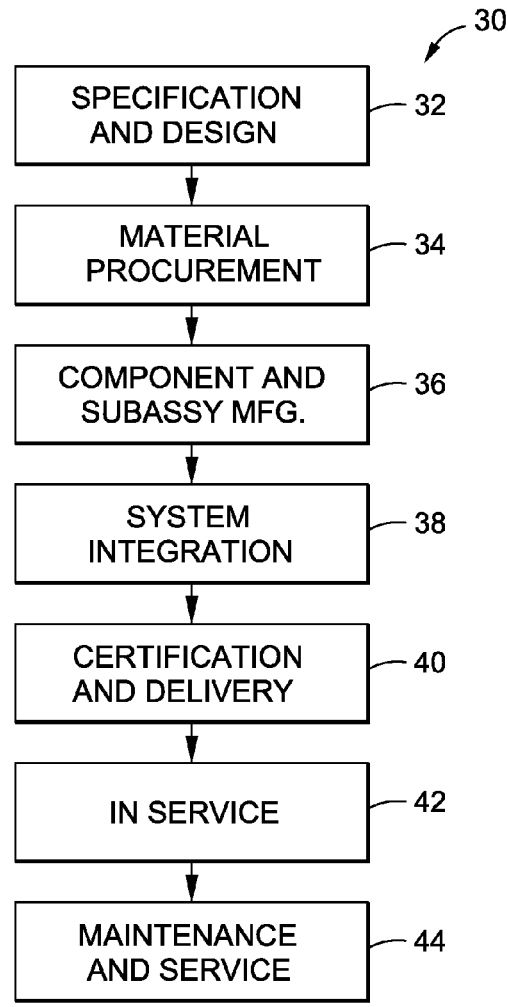
FIG. 2 is an illustration of a flow diagram of an embodiment of an aircraft manufacturing and service method.
Figure 3:
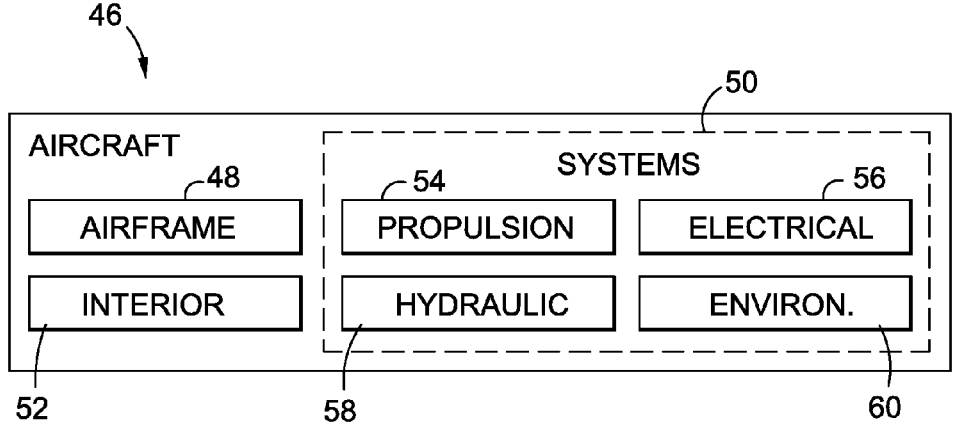
FIG. 3 is an illustration of a functional block diagram of an embodiment of an aircraft.

FIG. 2 is an illustration of a flow diagram of an embodiment of an aircraft manufacturing and service method 30. FIG. 3 is an illustration of a functional block diagram of an embodiment of an aircraft 46. Referring to FIGS. 2-3, embodiments of the disclosure may be described in the context of the aircraft manufacturing and service method 30, as shown in FIG. 2, and the aircraft 46, as shown in FIG. 3. During pre-production, the exemplary aircraft manufacturing and service method 30 (see FIG. 2) may include specification and design 32 (see FIG. 2) of the aircraft 46 (see FIG. 3) and material procurement 34 (see FIG. 2). During manufacturing, component and subassembly manufacturing 36 (see FIG. 2) and system integration 38 (see FIG. 2) of the aircraft 46 (see FIG. 3) takes place. Thereafter, the aircraft 46 (see FIG. 3) may go through certification and delivery 40 (see FIG. 2) in order to be placed in service 42 (see FIG. 2). While in service 42 (see FIG. 2) by a customer, the aircraft 46 (see FIG. 3) may be scheduled for routine maintenance and service 44 (see FIG. 2), which may also include modification, reconfiguration, refurbishment, and other suitable services.

Each of the processes of the aircraft manufacturing and service method 30 (see FIG. 2) may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may include an airline, leasing company, military entity, service organization, and other suitable operators.

As shown in FIG. 3, the aircraft 46 produced by the exemplary aircraft manufacturing and service method 30 may include an airframe 48 with a plurality of systems 50 and an interior 52. As further shown in FIG. 3, examples of the systems 50 may include one or more of a propulsion system 54, an electrical system 56, a hydraulic system 58, and an environmental system 60. Any number of other systems may be included. Although an aerospace example is shown, the principles of the disclosure may be applied to other industries, such as the automotive industry.

Methods and systems embodied herein may be employed during any one or more of the stages of the aircraft manufacturing and service method 30 (see FIG. 2). For example, components or subassemblies corresponding to component and subassembly manufacturing 36 (see FIG. 2) may be fabricated or manufactured in a manner similar to components or subassemblies produced while the aircraft 46 (see FIG. 3) is in service 42 (see FIG. 2). Also, one or more apparatus embodiments, method embodiments, or a combination thereof, may be utilized during component and subassembly manufacturing 36 (see FIG. 2) and system integration 38 (see FIG. 2), for example, by substantially expediting assembly of or reducing the cost of the aircraft 46 (see FIG. 3). Similarly, one or more of apparatus embodiments, method embodiments, or a combination thereof, may be utilized while the aircraft 46 (see FIG. 3) is in service 42 (see FIG. 2), for example and without limitation, to maintenance and service 44 (see FIG. 2).

Figure 4A:
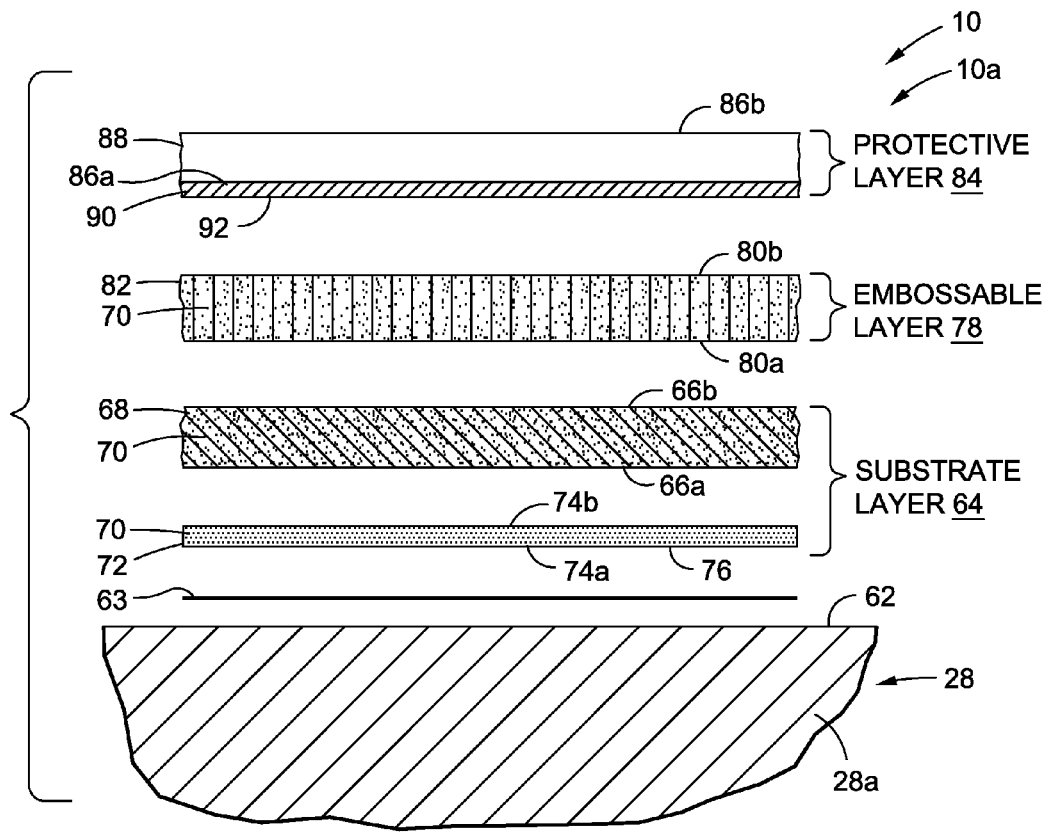
FIG. 4A is an illustration of an exploded side view of an embodiment of a decorative laminate of the disclosure.
Figure 4B:
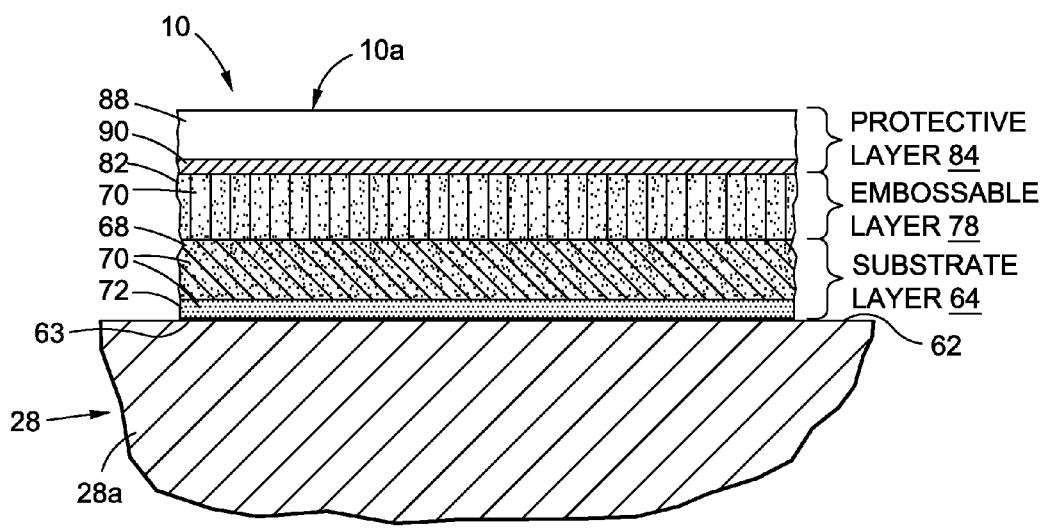
FIG. 4B is an illustration of an assembled side view of the decorative laminate of FIG. 4A.

Referring to FIGS. 4A-4B, in an embodiment of the disclosure, there is provided a decorative laminate 10, such as in the form of decorative laminate 10a, configured for application to a structural component 28, such as in the form of an aircraft structural component 28a. FIG. 4A is an illustration of an exploded side view of an embodiment of the decorative laminate 10, such as in the form of decorative laminate 10a, of the disclosure. FIG. 4B is an illustration of an assembled side view of the decorative laminate 10, such as in the form of decorative laminate 10a, of FIG. 4A.

Figure 5A:
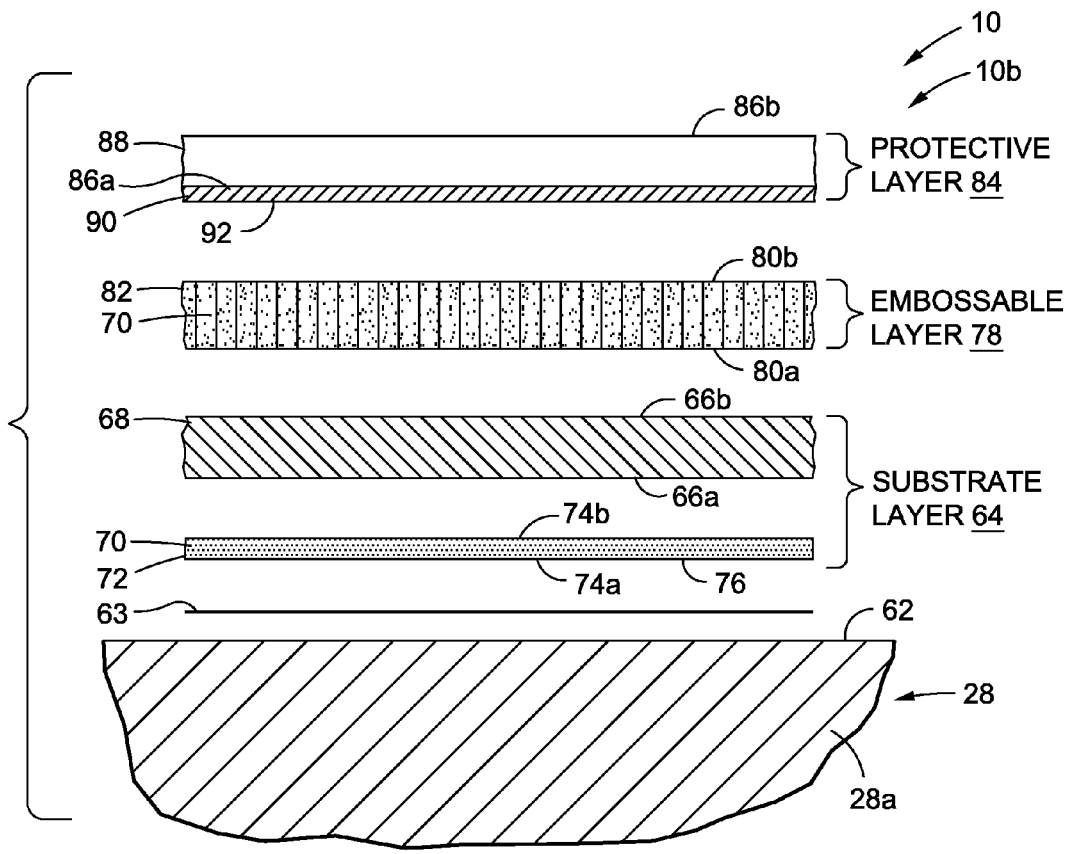
FIG. 5A is an illustration of an exploded side view of another embodiment of a decorative laminate of the disclosure.
Figure 5B:
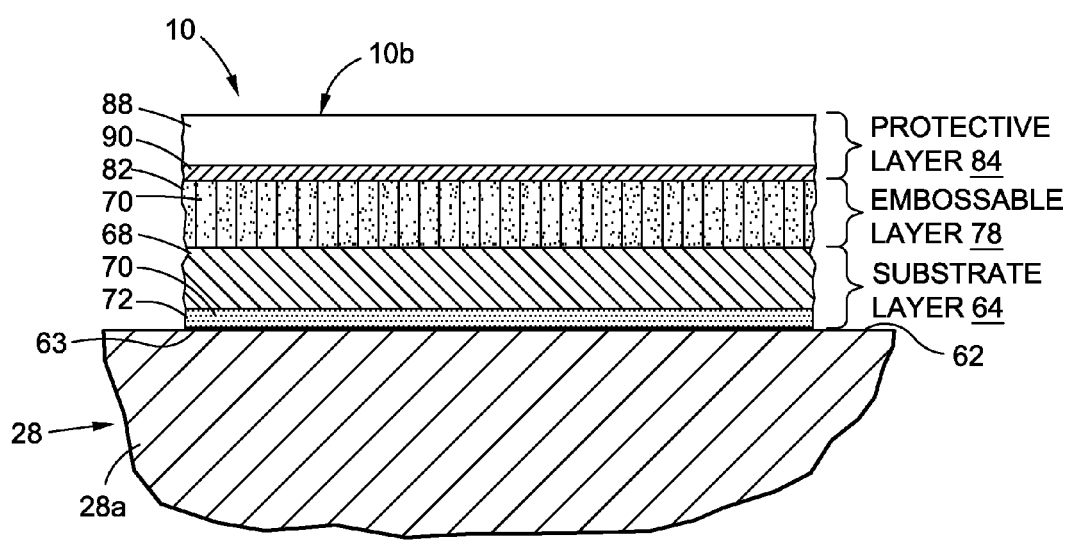
FIG. 5B is an illustration of an assembled side view of the decorative laminate of FIG. 5A; and, FIG. 6 is an illustration of a flow diagram of an embodiment of a method of the disclosure.

Referring to FIGS. 5A-5B, in another embodiment of the disclosure, there is provided a decorative laminate 10, such as in the form of decorative laminate 10b, configured for application to the structural component 28, such as in the form of aircraft structural component 28a. FIG. 5A is an illustration of an exploded side view of another embodiment of a decorative laminate 10, such as in the form of decorative laminate 10b, of the disclosure. FIG. 5B is an illustration of an assembled side view of the decorative laminate 10, such as in the form of decorative laminate 10b, of FIG. 5A.

Preferably, the decorative laminate 10 (see FIGS. 1, 4A-5B), discussed in further detail below, is a fiber-reinforced composite laminate that is cured. Preferably, the decorative laminate 10 (see FIGS. 1, 4A-5B) is durable, stain resistant, and abrasion and impact resistant while meeting Federal Aviation Administration (FAA) weight and fire retardant regulations and criteria.

As shown in FIGS. 4A-5B, the decorative laminate 10, such as in the form of decorative laminate 10a, or decorative laminate 10b, comprises a substrate layer 64. The substrate layer 64 (see FIGS. 4A-5B) has a first side 66a (see FIGS. 4A, 5A) and a second side 66b (see FIGS. 4A, 5A).

The substrate layer 64 (see FIGS. 4A-5B) comprises a nonwoven fabric material 68 (see FIGS. 4A-5B) with or without a flame retardant material 70 (see FIGS. 4A-5B). As shown in FIGS. 4A-4B, the nonwoven fabric material 68 includes the flame retardant material 70. Preferably, the flame retardant material 70 (see FIGS. 4A-5B) may be incorporated into the open porous structure of the nonwoven fabric material 68 (see FIGS. 4A-5B) and will not add additional thickness to the substrate layer 64 (see FIGS. 4A-5B). As shown in FIGS. 5A-5B, the nonwoven fabric material 68 does not include the flame retardant material 70 (see FIG. 4A).

The nonwoven fabric material 68 (see FIG. 4A) is preferably porous and does not have a pattern or repeating pattern. Because of the porous nature of the nonwoven fabric material 68 (see FIG. 4A), it is able to easily incorporate the flame retardant material 70 (see FIG. 4A) throughout the nonwoven fabric material 68 (see FIG. 4A).

Preferably, the nonwoven fabric material 68 (see FIG. 4A) comprises one or more of the following: synthetic polymer fibers being formed at least in part of a polymer selected from the group consisting of polyethylene terephthalate (PET), polytrimethylene terephthalate (PTT), polypropylene (PP), polyethylene (PE), polyamide (PA), polyphenylene sulfide (PPS), aramids, and co-polyester; glass fibers including fiberglass; carbon fiber; and a flame retardant material filled nonwoven fabric material, wherein the flame retardant material is either intumescent or non-intumescent. The flame retardant material 70 (see FIG. 4A) may thus be an intumescent flame retardant material or a non-intumescent flame retardant material. However, the nonwoven fabric material 68 (see FIG. 4A) may comprise other suitable nonwoven fiber materials. The synthetic polymer fibers of the nonwoven fabric material 68 (see FIGS. 4A-5B) preferably each have a fiber length in a range of about 1 mm (millimeter) to about 12 mm. The synthetic polymer fibers of the nonwoven fabric material 68 (see FIGS. 4A-5B) may be made with chopped fibers or with continuous fibers or another suitable fiber. Fiberglass may be made of chopped strand mats and may have a fiber length of about 1 mm to about 32 mm.

As used herein, "an intumescent flame retardant material" means a flame retardant material that swells and expands to many times its original thickness, as a result of heat exposure, such as by a flame or fire. The intumescent flame retardant material provides an insulating foam-like coating or "char" which protects the substrate layer 64 (see FIGS. 4A-5B) and the underlying structural component 28 (see FIGS. 1, 4A-5B), such as aircraft structural component 28a (see FIGS. 1, 4A-5B).

Preferably, the nonwoven fabric material 68 comprises unoriented fibers that do not distort at elevated temperatures during formation of the decorative laminate 10. Preferably, the nonwoven fabric material 68 (see FIG. 4A) comprises a plurality of fibers or microfibers. The presence of such fibers or microfibers, as well as the nonwoven fabric material 68 (see FIG. 4A) not having a pattern or a repeating pattern, may preferably increase a number of surface interfaces in the decorative laminate 10 (see FIGS. 4A-5B) that light passes through, as compared to existing decorative laminates with substrate layer films or a woven fiber substrate layer. This, in turn, may increase the opacity of the decorative laminate 10 (see FIGS. 4A-5B), and may result in effectively hiding from view any unattractive or otherwise unappealing features of the underlying structural component 28 (see FIGS. 1, 4A-5B), such as the underlying aircraft structural component 28a (see FIGS. 1, 4A-5B).

The flame retardant material 70 (see FIG. 4A) preferably comprises phosphorous flame retardants, phosphorus flame retardants polymerized with ethylene glycol and terephthalic acid, or another suitable flame retardant material 70 (see FIG. 4A). Preferably, the flame retardant material 70 (see FIG. 4A) meets the Federal Aviation Administration (FAA) fire retardant regulations and criteria.

After the decorative laminate 10 (see FIGS. 4B, 5B) is formed and before the decorative laminate 10 (see FIGS. 4B, 5B) is applied to the structural component 28 (see FIGS. 4A-5B), such as aircraft structural component 28a (see FIGS. 4A-5B), an adhesive layer 63 (see FIGS. 4A-5B) is preferably applied between the substrate layer 64 (see FIGS. 4A-5B) and the structural component 28 (see FIGS. 4A-5B), such as aircraft structural component 28a (see FIGS. 4A-5B). Preferably, the adhesive layer 63 (see FIGS. 4A-5B) comprises a pressure sensitive adhesive, a hot melt adhesive, a spray adhesive, or another suitable adhesive.

In one embodiment, once the decorative laminate 10 (see FIG. 4B) is formed, the adhesive layer 63 (see FIGS. 4A-5B) may be applied to the first side 66a (see FIGS. 4A, 5A) of the substrate layer 64 (see FIGS. 4A, 5A) of the decorative laminate 10 (see FIGS. 4A, 5A), before the decorative laminate 10 (see FIG. 4B) is applied to the structural component 28 (see FIG. 4B), such as aircraft structural component 28a (see FIG. 4B). The decorative laminate 10 (see FIGS. 4A-5B) is applied to the structural component 28 (see FIGS. 4A-5B), such as aircraft structural component 28a (see FIGS. 4A-5B), with the adhesive layer 63 (see FIGS. 4A-5B) on the substrate layer 64 (see FIGS. 4A-5B) being adjacent the bonding surface 62 (see FIGS. 4A-5B) of the structural component 28 (see FIGS. 4A-5B), such as aircraft structural component 28a (see FIGS. 4A-5B).

In another embodiment, if an optional flame retardant material layer 72 (see FIGS. 4A, 5A), discussed below, is added to the first side 66a (see FIGS. 4A, 5A) of the substrate layer 64 (see FIGS. 4A, 5A) of the decorative laminate 10 (see FIGS. 4A, 5A), the adhesive layer 63 (see FIGS. 4A-5B) may be applied to a flame retardant material side 76 (see FIGS. 4A, 5A), discussed below, of the substrate layer 64 (see FIGS. 4A, 5A), once the decorative laminate 10 (see FIG. 4B) is formed and before it is applied to the structural component 28 (see FIG. 4B), such as aircraft structural component 28a (see FIG. 4B).

Optionally, the decorative laminate 10 (see FIGS. 4A-5B) may further comprise the flame retardant material layer 72 (see FIGS. 4A-4B). Before the decorative laminate 10 (see FIGS. 4A-5B) is formed, the flame retardant material layer 72 (see FIGS. 4A-4B) may be added to the first side 66a (see FIG. 4A) of the substrate layer 64 (see FIG. 4A) (the nonwoven fabric material 68 (see FIGS. 4A-5B) with or without the flame retardant material 70 (see FIGS. 4A-5B)) to form a flame retardant material side 76 (see FIG. 4A). If the optional flame retardant material layer 72 (see FIGS. 4A-5B) is included in the decorative laminate 10 (see FIGS. 4A-5B), the flame retardant material side 76 (see FIG. 4A) is preferably configured to receive the adhesive layer 63 (see FIGS. 4A-5B) and face the bonding surface 62 (see FIG. 4A) of the structural component 28 (see FIG. 4A), such as aircraft structural component 28a (see FIG. 4A), once the decorative laminate 10 (see FIG. 4B) is formed and applied to the structural component 28 (see FIG. 4B), such as aircraft structural component 28a (see FIG. 4B).

The substrate layer 64 (see FIGS. 4A-5B) (nonwoven fabric material 68 (see FIGS. 4A-5B) with or without the flame retardant material 70 (see FIGS. 4A-5B), and with or without the flame retardant material layer 72 (see FIGS. 4A-4B)) preferably has a thickness in a range of between about 1.0 mils (mils=a thousandth of an inch) and about 40.0 mils. More preferably, the substrate layer 64 (see FIGS. 4A-5B) has a thickness in a range of between about 10.0 mils and about 30.0 mils. Most preferably, the substrate layer 64 (see FIGS. 4A-5B) has a thickness of about 15.0 mils.

As further shown in FIGS. 4A-5B, the decorative laminate 10, such as in the form of decorative laminate 10a, or decorative laminate 10b, comprises an embossable layer 78 disposed upon the second side 66b of the substrate layer 64. The embossable layer 78 (see FIG. 4A) has a first side 80a (see FIG. 4A) and a second side 80b (see FIG. 4A). Preferably, the nonwoven fabric material 68 (see FIG. 4A) is configured to mechanically reinforce the embossing resin material 82 (see FIG. 4A) of the embossable layer 78 (see FIG. 4A).

The embossable layer 78 (see FIG. 4A) comprises an embossing resin material 82 (see FIG. 4A) and additional flame retardant material 70 (see FIG. 4A). The embossing resin material 82 (see FIG. 4A) may comprise a thermoset resin comprising one or more of polyesters, polyurethanes, phenols, epoxies, a combination thereof, or another suitable thermoset resin. The embossing resin material 82 (see FIG. 4A) may also comprise a thermoplastic resin comprising one or more of polypropylene (PP), polyethylene (PE), polyethylene terephthalate (PET), polytrimethylene terephthalate (PTT), polyamide (PA), polyetherimide (PEI), polyvinyl chloride (PVC), polycarbonate, nylon, a combination thereof, or another suitable thermoplastic resin.

The embossable layer 78 (see FIGS. 4A-4B) preferably has a thickness in a range of between about 2.0 mils (mils=a thousandth of an inch) and about 8.0 mils. More preferably, the embossable layer 78 (see FIGS. 4A-4B) has a thickness in a range of between about 3.0 mils and about 6.0 mils. Most preferably, the embossable layer 78 (see FIGS. 4A-4B) has a thickness of about 5.0 mils.

As further shown in FIGS. 4A-5B, the decorative laminate 10, such as in the form of decorative laminate 10a, or decorative laminate 10b, comprises a protective layer 84 disposed upon the embossable layer 78. The protective layer 84 (see FIGS. 4A, 5A) has a first side 86a (see FIGS. 4A, 5A) and a second side 86b (see FIGS. 4A, 5A). The protective layer 84 (see FIGS. 4A-4B) is preferably an optically clear or semi-clear outer layer that covers and protects the embossable layer 78 (see FIGS. 4A-5B) and the substrate layer 64 (see FIGS. 4A-5B). Preferably, the protective layer 84 (see FIGS. 4A-5B) has a high gloss or medium gloss.

The protective layer 84 (see FIGS. 4A-5B) preferably comprises a polyvinyl fluoride-based material 88 (see FIGS. 4A-5B). Preferably, the protective layer 84 (see FIGS. 4A-5B) comprises polyvinyl fluoride-based material 88 (see FIGS. 4A-5B), due to the physical toughness, chemical inertness, abrasion and soil resistance, and consistency of character regardless of temperature changes, of polyvinyl fluorides. The polyvinyl fluorides are also able to receive a wide variety of inks used for printing graphics.

As used herein, the term "polyvinyl fluoride-based material" refers to a polyvinyl fluoride polymer (i.e., a polymer formed from vinyl fluoride). The fluorinated polymer is generally a polymer, copolymer, or terpolymer of vinyl fluoride. The preferred polyvinyl fluoride polymers are polyvinyl fluoride (PVF) and polyvinylidene fluoride (PVDF). PVF is commercially available as TEDLAR. (TEDLAR is a registered trademark of E.I. DuPont de Nemours and Company of Wilmington, Del.) PVDF is commercially available as KYNAR. (KYNAR is a registered trademark of Arkema, Inc. of Prussia, Pa.)

The protective layer 84 (see FIGS. 4A-5B) preferably has a thickness in a range of between about 0.2 mils (mils=a thousandth of an inch) and about 3.0 mils. More preferably, the protective layer 84 (see FIGS. 4A-5B) has a thickness in a range of between about 0.7 mils and 2.5 mils. Most preferably, the protective layer 84 (see FIGS. 4A-5B) has a thickness of about 0.7 mils. The protective layer 84 (see FIGS. 4A-5B) may be formed by casting, extrusion, or another known suitable formation process or method.

The protective layer 84 (see FIGS. 4A-5B) further has a decorative material 90 (see FIGS. 4A-5B) printed on a first side 86a (see FIGS. 4A, 5A) of the protective layer 84 (see FIGS. 4A, 5A), which forms a printed decorative material side 92 (see FIGS. 4A, 5A) of the protective layer 84 (see FIGS. 4A-5B). Upon formation and lamination of the decorative laminate 10 (see FIGS. 4A-5B), the printed decorative material side 92 (see FIGS. 4A, 5A) faces and is adjacent to the embossable layer 78 (see FIGS. 4A, 5A). The printed decorative material side 92 (see FIGS. 4A, 5A) is preferably laminated to the second side 80b (see FIGS. 4A, 5A) of the embossable layer 78 (see FIGS. 4A, 5A).

The printed decorative material side 92 (see FIGS. 4A, 5A) of the protective layer 84 (see FIGS. 4A, 5A) is primarily used to supply a decorative effect to the decorative laminate 10 (see FIGS. 4A, 5A), for example, a wood grain, a marble, a solid color, a patterned effect, or another suitable decorative effect. Preferably, the decorative material 90 (see FIGS. 4A, 5A) comprises one or more of a printing ink, a pigmented medium including a colored ink or a stain, a silk screen print, a digital print, a paint, or another suitable decorative material 90 (see FIGS. 4A, 5A).

Preferred processes or methods of printing or applying the decorative material 90 (see FIGS. 4A-5B) to the first side 86a (see FIGS. 4A, 5A) of the protective layer 84 (see FIGS. 4A, 5A) may comprise screen printing, silk screening, flexographic silk screening, ink-jet printing, laser screen printing, digital printing, ultraviolet and electron beam printing, painting, or another suitable printing or application process or method.

The second side 86b (see FIGS. 4A, 5A) of the protective layer 84 (see FIGS. 4A, 5A) is preferably exposed and faces an interior environment of the aircraft 12a (see FIG. 1). Since the protective layer 84 (see FIGS. 4A-5B) is preferably an optically clear or semi-clear layer, when the decorative material 90 (see FIGS. 4A-5B) is printed on the first side 86a (see FIGS. 4A, 5A) of the protective layer 84 (see FIGS. 4A, 5A), the decorative material 90 (see FIGS. 4A, 5A) is visible through the protective layer 84 (see FIG. 4A, 5A) after lamination and processing.

In another embodiment of the disclosure, there is provided an aircraft 12a (see FIG. 1). The aircraft 12a (see FIG. 1) comprises a fuselage 14 (see FIG. 1) and at least one wing 18 (see FIG. 1) coupled to the fuselage 14 (see FIG. 1). The aircraft 12a (see FIG. 1) further comprises at least one aircraft structural component 28a (see FIG. 1) having a decorative laminate 10 (see FIGS. 1, 4A-5B).

As discussed in more detail above, the decorative laminate 10 (see FIGS. 4A-5B) comprises a substrate layer 64 (see FIGS. 4A-5B) comprising a nonwoven fabric material 68 (see FIGS. 4A-5B) with or without a flame retardant material 70 (see FIGS. 4A-5B). The decorative laminate 10 (see FIGS. 4A-5B) further comprises an embossable layer 78 (see FIGS. 4A-5B) disposed upon the substrate layer 64 (see FIGS. 4A-5B). The embossable layer 78 (see FIGS. 4A-5B) comprises an embossing resin material 82 (see FIGS. 4A-5B) and the flame retardant material 70 (see FIGS. 4A-5B).

As discussed in more detail above, the decorative laminate 10 (see FIGS. 4A-5B) further comprises a protective layer 84 (see FIGS. 4A-5B) disposed upon the embossable layer 78 (see FIGS. 4A-5B). The protective layer 84 (see FIGS. 4A-5B) comprises a polyvinyl fluoride-based material 88 (see FIGS. 4A-5B) and has a decorative material 90 (see FIGS. 4A-5B) printed on a first side 86a (see FIG. 4A) of the protective layer 84 (see FIGS. 4A-5B) facing the embossable layer 78 (see FIGS. 4A-5B).

The decorative laminate 10 (see FIGS. 4A-5B) is applied to the at least one aircraft structural component 28a (see FIGS. 4A-5B) with the substrate layer 64 (see FIGS. 4A-5B) facing, or in one embodiment being adjacent to, the bonding surface 62 (see FIGS. 4A-5B) of the aircraft structural component 28a (see FIGS. 4A-5B) and with an adhesive layer 63 (see FIGS. 4A-5B) applied between the decorative laminate 10 (see FIGS. 4A-5B) and the bonding surface 62 (see FIGS. 4A-5B) of the at least one aircraft structural component 28a (see FIGS. 4A-5B).

As discussed in more detail above, the decorative laminate 10 (see FIGS. 4A-5B) may optionally further comprises a flame retardant material layer 72 (see FIGS. 4A-5B) added to a first side 66a (see FIGS. 4A, 5A) of the substrate layer 64 (see FIGS. 4A-5B) to form a flame retardant material side 76 (see FIGS. 4A, 5A). The flame retardant material side 76 (see FIGS. 4A, 5A) is preferably configured to receive the adhesive layer 63 (see FIGS. 4A-5B) and face the bonding surface 62 (see FIGS. 4A, 5A) of the aircraft structural component 28a (see FIGS. 4A, 5A), once the decorative laminate 10 (see FIGS. 4A-5B) is formed and applied to the aircraft structural component 28a (see FIGS. 4A-5B).

As discussed in more detail above, the nonwoven fabric material 68 (see FIGS. 4A-5B) is porous and is comprised of one or more of the following: synthetic polymer fibers being formed at least in part of a polymer selected from the group consisting of polyethylene terephthalate (PET), polytrimethylene terephthalate (PTT), polypropylene (PP), polyethylene (PE), polyamide (PA), polyphenylene sulfide (PPS), aramids, and co-polyester; glass fibers including fiberglass; carbon fiber; and a flame retardant material filled nonwoven fabric material, wherein the flame retardant material is either intumescent or non-intumescent. The flame retardant material 70 (see FIG. 4A) may thus be an intumescent flame retardant material or a non-intumescent flame retardant material.

As discussed in more detail above, the nonwoven fabric material 68 (see FIGS. 4A-5B) preferably has a plurality of fibers or microfibers that increase a number of surface interfaces that light passes through in the decorative laminate 10 (see FIGS. 4A-5B). This may result in an increased opacity of the decorative laminate 10 (see FIGS. 4A-5B) and the aircraft structural component 28a (see FIGS. 4A-5B) under the decorative laminate 10 (see FIGS. 4A-5B). Preferably, the nonwoven fabric material 68 (see FIGS. 4A-5B) comprises unoriented fibers that do not distort at elevated temperatures during formation of the decorative laminate 10 (see FIGS. 4A-5B).

Figure 6:
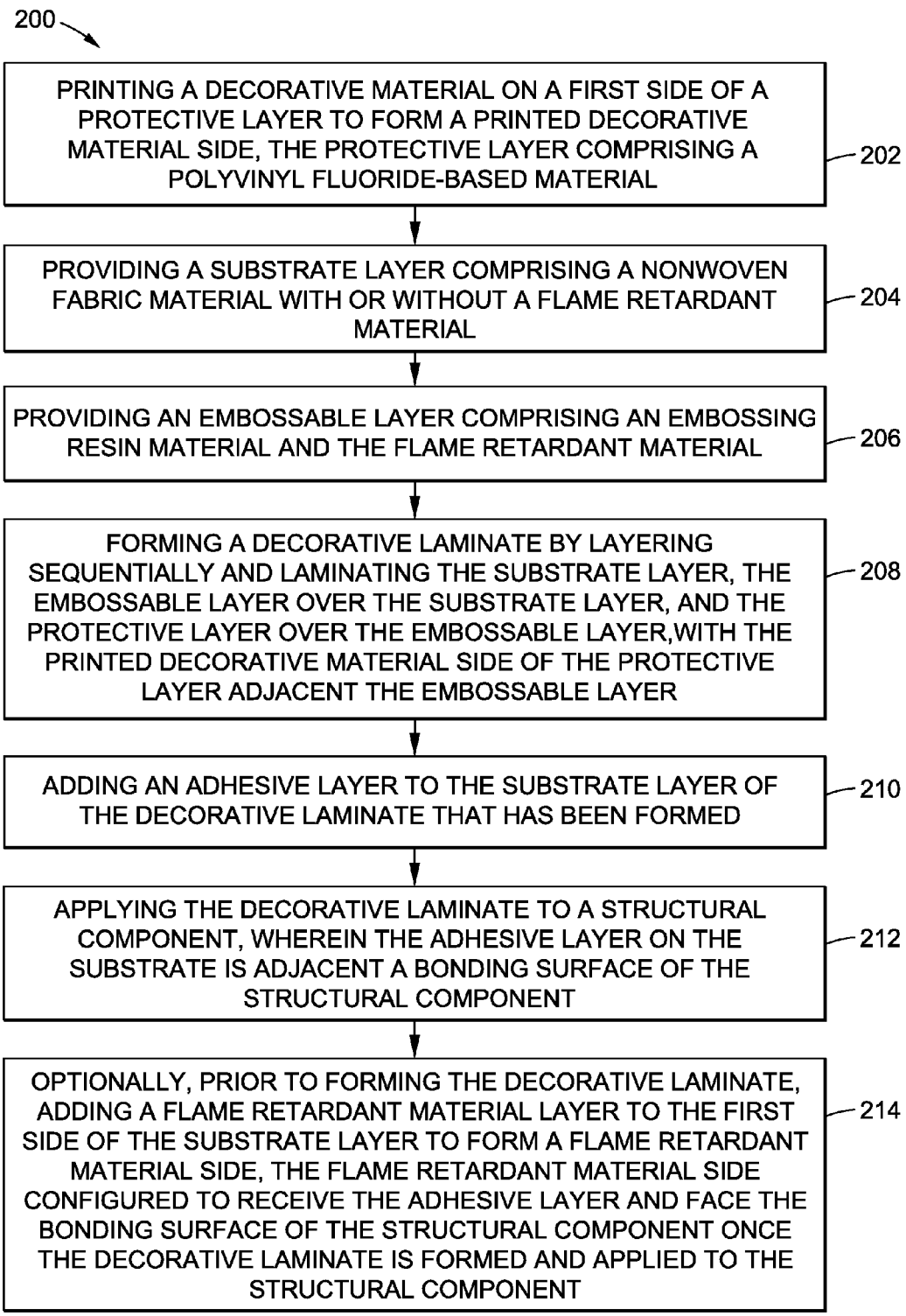

Referring to FIG. 6, in another embodiment of the disclosure, there is provided a method 200 of making a decorative laminate 10 (see FIGS. 4A-5B) for application to a structural component 28 (see FIGS. 4A-5B), such as an aircraft structural component 28a (see FIGS. 1, 4A-4B). FIG. 6 is an illustration of a flow diagram of an embodiment of the method 200 of the disclosure.

As shown in FIG. 6, the method 200 comprises step 202 of printing a decorative material 90 (see FIGS. 4A-5B) on a first side 86a (see FIGS. 4A, 5A) of the protective layer 84 (see FIGS. 4A, 5A) to form the printed decorative material side 92 (see FIGS. 4A, 5A). The protective layer 84 (see FIGS. 4A, 5A) comprises the polyvinyl fluoride-based material 88 (see FIGS. 4A, 5A).

As shown in FIG. 6, the method 200 further comprises step 204 of providing the substrate layer 64 (see FIGS. 4A-5B). The substrate layer 64 (see FIGS. 4A-5B) comprises the nonwoven fabric material 68 (see FIGS. 4A-5B) with the flame retardant material 70 (see FIGS. 4A-4B) or without the flame retardant material 70 (see FIGS. 5A-5B). The step 204 of providing the substrate layer 64 comprises forming the nonwoven fabric material 68 as unoriented fibers that do not distort at elevated temperatures during formation of the decorative laminate 10.

The step 204 of providing the substrate layer 64 further comprises providing the nonwoven fabric material 68 comprised of one or more of: synthetic polymer fibers being formed at least in part of a polymer selected from the group consisting of polyethylene terephthalate (PET), polytrimethylene terephthalate (PTT), polypropylene (PP), polyethylene (PE), polyamide (PA), polyphenylene sulfide (PPS), aramids, and co-polyester; glass fibers including fiberglass; carbon fiber; and a flame retardant material filled nonwoven fabric material, wherein the flame retardant material is either intumescent or non-intumescent. Thus, the flame retardant material 70 (see FIG. 4A) may be an intumescent flame retardant material or a non-intumescent flame retardant material.

As shown in FIG. 6, the method 200 further comprises step 206 of providing the embossable layer 78 (see FIGS. 4A-5B). The embossable layer 78 (see FIGS. 4A-5B) comprises the embossing resin material 82 (see FIGS. 4A-5B) and the flame retardant material 70 (see FIGS. 4A-5B).

As shown in FIG. 6, the method 200 further comprises step 208 of forming the decorative laminate 10 (see FIGS. 4A-5B) by layering sequentially and laminating the substrate layer 64 (see FIGS. 4A-5B), the embossable layer 78 (see FIGS. 4A-5B) over the substrate layer (see FIGS. 4A-5B), and the protective layer 84 (see FIGS. 4A, 5A) over the embossable layer 78 (see FIGS. 4A-5B). The printed decorative material side 92 (see FIGS. 4A, 5A) of the protective layer 84 (see FIGS. 4A, 5A) is adjacent the embossable layer 78 (see FIGS. 4A-5B).

The step 208 of forming the decorative laminate 10 (see FIGS. 4A-5B) comprises preferably using a press forming process to heat and cure the substrate layer 64, the embossable layer 78, and the protective layer 84 at an effective elevated temperature and an effective pressure for an effective period of time to form the decorative laminate 10 (see FIGS. 4A-5B). The substrate layer 64, the embossable layer 78, and the protective layer 84 are preferably layered and laid up on a flat configuration, such as a flat metal caul plate or the like, in large sheets, e.g., 5 feet by 8 feet. The large sheets are preferably heated and cured in a multiple opening press, such as with flat platens, used in the press forming process.

The effective elevated temperature for heating and curing the substrate layer 64, the embossable layer 78, and the protective layer 84 is preferably in a range of from about 300° F. (degrees Fahrenheit) to about 330° F. (degrees Fahrenheit), and is more preferably, at a temperature of about 320° F. (degrees Fahrenheit). The effective period of time for heating and curing the substrate layer 64, the embossable layer 78, and the protective layer 84 is preferably in a range of from about 10 (ten) minutes to about 30 (thirty) minutes, and more preferably, about 20 (twenty) minutes. The effective pressure for heating and curing substrate layer 64, the embossable layer 78, and the protective layer 84 is preferably at a high pressure, for example, 100 psi (pounds per square inch). The temperature, pressure, and time selected for the heating and curing is preferably selected based on the type of embossing resin material 82 (see FIGS. 4A-5B) used in the forming the decorative laminate 10 (see FIGS. 4A-5B), for example, a thermoset resin or a thermoplastic resin used, or the type of thermoset resin or type of thermoplastic resin used.

Preferably, the large sheets of the laid up substrate layer 64, embossable layer 78, and protective layer 84 are heated and cured in a multiple opening press at 100 psi (pounds per square inch) at about 320° F. (degrees Fahrenheit) for about 20 (twenty) minutes. The decorative laminate 10 (see FIGS. 4A-5B) is preferably cooled in the multiple opening press to ambient temperature and then removed for application to the structural component 28 (see FIGS. 1, 4A-5B), such as aircraft structural component 28a (see FIGS. 1, 4A-5B). The decorative laminate 10 may also be formed with other known press forming processes.

As shown in FIG. 6, the method 200 further comprises step 210 of adding an adhesive layer 63 (see FIGS. 4A-5B) to the substrate layer 64 (see FIGS. 4A-5B) of the decorative laminate 10 (see FIGS. 4A-5B) that has been formed. Preferably, the adhesive layer 63 (see FIGS. 4A-5B) comprises a pressure sensitive adhesive, a hot melt adhesive, a spray adhesive, or another suitable adhesive.

As shown in FIG. 6, the method 200 further comprises step 212 of applying the decorative laminate 10 (see FIGS. 4A-5B) to the structural component 28 (see FIGS. 1, 4A-5B), such as aircraft structural component 28a (see FIGS. 1, 4A-5B). The adhesive layer 63 (see FIGS. 4A-5B) on the substrate layer 64 (see FIGS. 4A-5B) is adjacent the bonding surface 62 (see FIGS. 4A-5B) of the structural component 28 (see FIGS. 1, 4A-5B), such as aircraft structural component 28a (see FIGS. 1, 4A-5B).

The step 212 of applying the decorative laminate 10 (see FIGS. 4A-5B) to the structural component 28 (see FIGS. 1, 4A-5B) further comprises applying the decorative laminate 10 (see FIGS. 4A-5B) to the structural component 28 (see FIGS. 4A-5B), where the structural component 28 (see FIGS. 4A-5B) comprises an aircraft structural component 28b (see FIGS. 4A-5B), a rotorcraft structural component, a spacecraft structural component, a watercraft structural component, an automobile structural component, a truck structural component, or another suitable structural component.

The step 212 of applying the decorative laminate 10 (see FIGS. 4A-5B) to the structural component 28 (see FIGS. 1, 4A-5B), such as aircraft structural component 28a (see FIGS. 4A-5B), further comprises applying the decorative laminate 10 (see FIGS. 4A-5B) to one or more of a flat surface, a curved surface, a contoured surface, or another suitable surface, of the structural component 28 (see FIGS. 1, 4A-5B), such as aircraft structural component 28a (see FIGS. 4A-5B).

As shown in FIG. 6, the method 200 further comprises optional step 214 of prior to the step 208 of forming the decorative laminate 10 (see FIGS. 4A-5B), adding a flame retardant material layer 72 (see FIGS. 4A-5B) to the first side 66a (see FIGS. 4A, 5A) of the substrate layer 64 (see FIGS. 4A, 5A) to form a flame retardant material side 76 (see FIGS. 4A, 5A). The flame retardant material side 76 (see FIGS. 4A, 5A) is configured to receive the adhesive layer 63 (see FIGS. 4A-5B) and face the bonding surface 62 (see FIGS. 4A-5B) of the structural component 28 (see FIGS. 1, 4A-5B), such as aircraft structural component 28a (see FIGS. 1, 4A-5B), once the decorative laminate 10 (see FIGS. 4A-5B) is formed and applied to the structural component 28 (see FIGS. 1, 4A-5B), such as aircraft structural component 28a (see FIGS. 1, 4A-5B).

In one embodiment, once the decorative laminate 10 (see FIG. 4B) is formed, the adhesive layer 63 (see FIGS. 4A-5B) may be applied to the first side 66a (see FIGS. 4A, 5A) of the substrate layer 64 (see FIGS. 4A, 5A) of the decorative laminate 10 (see FIGS. 4A, 5A), before the decorative laminate 10 (see FIG. 4B) is applied to the structural component 28 (see FIG. 4B), such as aircraft structural component 28a (see FIG. 4B). In another embodiment, if the optional flame retardant material layer 72 (see FIGS. 4A, 5A) is added to the first side 66a (see FIGS. 4A, 5A) of the substrate layer 64 (see FIGS. 4A, 5A) of the decorative laminate 10 (see FIGS. 4A, 5A) prior to formation of the decorative layer 10 (see FIGS. 4A-5B), the adhesive layer 63 (see FIGS. 4A-5B) may be applied to the flame retardant material side 76 (see FIGS. 4A, 5A) of the substrate layer 64 (see FIGS. 4A, 5A), once the decorative laminate 10 (see FIG. 4B) is formed and before it is applied to the structural component 28 (see FIG. 4B), such as aircraft structural component 28a (see FIG. 4B).

The decorative laminate 10 may be applied to the structural component 28 (see FIGS. 4B, 5B), such as aircraft structural component 28a (see FIGS. 4B, 5B), using known processes such as thermoforming, vacuum forming, or another suitable known application process for applying the decorative laminate. 10 (see FIGS. 4A-5B) to the structural component 28 (see FIG. 4B), such as aircraft structural component 28a (see FIG. 4B).

Disclosed embodiments of the decorative laminate 10 (see FIGS. 4A-5B), the method 200 (see FIG. 6) provide numerous advantages over known decorative laminates and methods of making the same, and in particular, as compared to known decorative laminates and methods using a substrate layer of polyvinyl fluoride (PVF) films with an adhesive-based embossing resin bonding to various layers. Such advantages may include increased strength, increased tear and tensile strength, and decreased distortion or shrinkage when exposed to elevated processing temperatures during processing of the decorative laminate 10 (see FIGS. 4A-5B). Such decreased distortion or shrinkage when exposed to elevated processing temperatures during processing may result in decreased rejection of the decorative laminate 10 (see FIGS. 4A-5B) during production based on quality requirements.

Moreover, using nonwoven fabric material 68 (see FIGS. 4A-5B) in the decorative laminate 10 (see FIGS. 4A-5B) may provide improved fire retardant properties and increased opacity due to fibers and microfibers and no pattern or no repeating pattern in the nonwoven fabric material 68 (see FIGS. 4A-5B), which, in turn, may result in an increased number of surface interfaces for light to pass through in the nonwoven fiber material 68 (see FIGS. 4A-5B). Such increased opacity facilitates hiding of unattractive or otherwise unappealing features of the underlying structural component 28 (see FIGS. 1, 4A-5B), such as the aircraft structural component 28a (see FIGS. 1, 4A-5B) when using new decorative laminates 10 (see FIGS. 4A-5B) or refurbishing decorative laminates 10 (see FIGS. 4A-5B).

In addition, disclosed embodiments of the decorative laminate 10 (see FIGS. 4A-5B) and the method 200 (see FIG. 6) provide advantages over known decorative laminates and methods of making the same, and in particular, as compared to known decorative laminates and methods using a substrate layer of woven fiber material, such as with an embossable layer and a protective layer. Such advantages of the nonwoven fabric material 68 (see FIGS. 4A-5B) may include not having a pattern or a repeating pattern, which may result in decreased or no creation of a superimposed pattern that may affect the overall appearance of the decorative laminate 10 (see FIGS. 4A-5B). This, in turn, may result in decreased rejection of the decorative laminate 10 (see FIGS. 4A-5B) during production based on appearance or aesthetic requirements.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A decorative laminate formed and applied to an aircraft interior structural component, the decorative laminate comprising:
 a substrate layer comprising a nonwoven fabric material comprised of one or more of: synthetic polymer fibers being formed at least in part of a polymer selected from the group consisting of polyethylene terephthalate (PET), polytrimethylene terephthalate (PTT), polypropylene (PP), polyethylene (PE), polyamide (PA), polyphenylene sulfide (PPS), aramids, and co-polyester; and carbon fiber; and a flame retardant material filled nonwoven fabric material;
 an embossable layer disposed upon the substrate layer, the embossable layer comprising a flame retardant material and an embossing resin material comprising one of, a thermoset resin and a thermoplastic resin; and
 a protective layer disposed upon the embossable layer, the protective layer comprising a polyvinyl fluoride-based material and having a first side and a second side, wherein a decorative material is printed on the first side of the protective layer facing the embossable layer, and the second side is exposed to an interior aircraft environment, the decorative material being visible through the protective layer,
 wherein the decorative laminate is formed and applied to the aircraft interior structural component with the substrate layer facing a bonding surface of the aircraft interior structural component and with an adhesive layer applied between the decorative laminate and the bonding surface of the aircraft interior structural component, and further wherein the nonwoven fabric material does not have a repeating pattern, thus avoiding creation of a superimposed pattern resulting from a combination of the repeating pattern and the decorative material.

2. The decorative laminate of claim 1, further comprising a flame retardant material layer added to a first side of the substrate layer to form a flame retardant material side, the flame retardant material side configured to receive the adhesive layer and face the bonding surface of the aircraft interior structural component once the decorative laminate is formed and applied to the aircraft interior structural component.

3. The decorative laminate of claim 1, wherein the nonwoven fabric material is porous and the flame retardant material filled nonwoven fabric material of the substrate layer is either intumescent or non-intumescent.

4. The decorative laminate of claim 1, wherein the nonwoven fabric material is configured to mechanically reinforce the embossing resin material of the embossable layer.

5. The decorative laminate of claim 1, wherein the aircraft interior structural component comprises one of, an interior ceiling decorative panel, an interior sidewall decorative panel, a cabin interior sidewall, a cabin interior ceiling panel, a floor panel, a stowage bin, a lavatory panel, a galley panel, a bulkhead partition, a cargo bin liner, a window shade, and a composite noise panel.

6. The decorative laminate of claim 1, wherein the flame retardant material of the embossable layer and of the flame retardant material filled nonwoven fabric material of the substrate layer comprises phosphorous flame retardants and phosphorus flame retardants polymerized with ethylene glycol and terephthalic acid.

7. The decorative laminate of claim 1, wherein the thermoset resin of the embossing resin material comprises one or more of polyesters, polyurethanes, phenols, epoxies, and a combination thereof; or wherein the thermoplastic resin of the embossing resin material comprises one or more of polypropylene (PP), polyethylene (PE), polyethylene terephthalate (PET), polytrimethylene terephthalate (PTT), polyamide (PA), polyetherimide (PEI), polyvinyl chloride (PVC), polycarbonate, nylon, and a combination thereof.

8. The decorative laminate of claim 1, wherein the polyvinyl fluoride-based material comprises thermoplastic fluoropolymers selected from the group consisting of polyvinyl fluoride (PVF) and polyvinylidene fluoride (PVDF).

9. The decorative laminate of claim 1, wherein the decorative material comprises one or more of a printing ink, a pigmented medium including a colored ink or a stain, a silk screen print, a digital print, and a paint.

10. An aircraft comprising:
a fuselage;
at least one wing coupled to the fuselage;
at least one aircraft interior structural component covered with a decorative laminate formed and applied to the at least one aircraft interior structural component, the decorative laminate comprising:
  a substrate layer comprising a nonwoven fabric material comprised of one or more of: synthetic polymer fibers being formed at least in part of a polymer selected from the group consisting of polyethylene terephthalate (PET), polytrimethylene terephthalate (PTT), polypropylene (PP), polyethylene (PE), polyamide (PA), polyphenylene sulfide (PPS), aramids, and co-polyester; and carbon fiber; and a flame retardant material filled nonwoven fabric material;
  an embossable layer disposed upon the substrate layer, the embossable layer comprising a flame retardant material and an embossing resin material comprising one of, a thermoset resin and a thermoplastic resin; and
  a protective layer disposed upon the embossable layer, the protective layer comprising a polyvinyl fluoride-based material and having a first side and a second side, wherein a decorative material is printed on the first side of the protective layer facing the embossable layer, and the second side is exposed to an interior aircraft environment, the decorative material being visible through the protective layer and comprising one or more of a printing ink, a pigmented medium including a colored ink or a stain, a silk screen print, a digital print, and a paint,
  wherein the decorative laminate is formed and applied to the at least one aircraft interior structural component with the substrate layer facing a bonding surface of the at least one aircraft interior structural component and with an adhesive layer applied between the decorative laminate and the bonding surface of the at least one aircraft interior structural component, and further wherein the nonwoven fabric material does not have a repeating pattern, thus avoiding creation of a superimposed pattern resulting from a combination of the repeating pattern and the decorative material.

11. The aircraft of claim 10, wherein the decorative laminate further comprises a flame retardant material layer added to a first side of the substrate layer to form a flame retardant material side, the flame retardant material side configured to receive the adhesive layer and face the bonding surface of the aircraft interior structural component once the decorative laminate is formed and applied to the aircraft interior structural component.

12. The aircraft of claim 10, wherein the nonwoven fabric material is porous and the flame retardant material filled nonwoven fabric material of the substrate layer is either intumescent or non-intumescent.

13. The aircraft of claim 10, wherein the nonwoven fabric material has a plurality of microfibers and fibers that increase a number of surface interfaces that light passes through, resulting in an increased opacity of the decorative laminate and the at least one aircraft interior structural component under the decorative laminate.

14. The aircraft of claim 10, wherein the aircraft interior structural component comprises one of, an interior ceiling decorative panel, an interior sidewall decorative panel, a cabin interior sidewall, a cabin interior ceiling panel, a floor panel, a stowage bin, a lavatory panel, a galley panel, a bulkhead partition, a cargo bin liner, a window shade, and a composite noise panel.

15. A method of making a decorative laminate for application to an aircraft interior structural component, the method comprising the steps of:
printing a decorative material on a first side of a protective layer to form a printed decorative material side, the protective layer being formed by casting, and comprising a polyvinyl fluoride-based material, the protective layer having a second side exposed to an interior aircraft environment, and the decorative material being visible through the protective layer;
providing a substrate layer comprising a nonwoven fabric material comprised of one or more of: synthetic polymer fibers being formed at least in part of a polymer selected from the group consisting of polyethylene terephthalate (PET), polytrimethylene terephthalate (PTT), polypropylene (PP), polyethylene (PE), polyamide (PA), polyphenylene sulfide (PPS), aramids, and co-polyester; and carbon fiber; and a flame retardant material filled nonwoven fabric material, wherein the nonwoven fabric material does not have a repeating pattern, thus avoiding creation of a superimposed pattern resulting from a combination of the repeating pattern and the decorative material;
providing an embossable layer comprising a flame retardant material and an embossing resin material comprising one of, a thermoset resin and a thermoplastic resin;
forming the decorative laminate by layering sequentially and laminating the substrate layer, the embossable layer over the substrate layer, and the protective layer over the embossable layer, with the printed decorative material side of the protective layer adjacent the embossable layer;
adding an adhesive layer to the substrate layer of the decorative laminate that has been formed; and,
applying the decorative laminate to the aircraft interior structural component, wherein the adhesive layer on the substrate layer is adjacent a bonding surface on the aircraft interior structural component.

16. The method of claim 15, further comprising prior to the step of forming the decorative laminate, the step of adding a flame retardant material layer to the first side of the substrate layer to form a flame retardant material side, the flame retardant material side configured to receive the adhesive layer and face the bonding surface of the aircraft interior structural component once the decorative laminate is formed and applied to the aircraft interior structural component.

17. The method of claim 15, wherein the step of forming the decorative laminate comprises using a press forming process to heat and cure the substrate layer, the embossable layer, and the protective layer at an effective elevated temperature and at an effective pressure for an effective period of time to form the decorative laminate.

18. The method of claim 15, wherein the step of providing the substrate layer comprises providing the nonwoven fabric material that is porous and the flame retardant material filled nonwoven fabric material of the substrate layer is either intumescent or non-intumescent.

19. The method of claim 15, wherein the step of applying the decorative laminate to the aircraft interior structural component comprises applying the decorative laminate to the aircraft interior structural component comprising one of, an interior ceiling decorative panel, an interior sidewall decorative panel, a cabin interior sidewall, a cabin interior ceiling panel, a floor panel, a stowage bin, a lavatory panel, a galley panel, a bulkhead partition, a cargo bin liner, a window shade, and a composite noise panel.

20. The method of claim 15, wherein the step of applying the decorative laminate to the aircraft interior structural component comprises applying the decorative laminate to one or more of a flat surface, a curved surface, and a contoured surface, of the aircraft interior structural component.

* * * * *